United States Patent
Zeng et al.

(10) Patent No.: US 10,891,786 B2
(45) Date of Patent: Jan. 12, 2021

(54) GENERATING DATA FOR A THREE-DIMENSIONAL (3D) PRINTABLE OBJECT, INCLUDING A TRUSS STRUCTURE

(71) Applicant: Hewlett-Packard Development Company, L.P., Spring, TX (US)

(72) Inventors: Jun Zeng, Palo Alto, CA (US); Ana Del Angel, Guadalajara (MX); Scott White, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 13 days.

(21) Appl. No.: 16/331,373

(22) PCT Filed: Oct. 11, 2016

(86) PCT No.: PCT/US2016/056347
§ 371 (c)(1),
(2) Date: Mar. 7, 2019

(87) PCT Pub. No.: WO2018/070993
PCT Pub. Date: Apr. 19, 2018

(65) Prior Publication Data
US 2019/0362543 A1 Nov. 28, 2019

(51) Int. Cl.
*G06T 17/00* (2006.01)
*G06T 17/20* (2006.01)
(Continued)

(52) U.S. Cl.
CPC .......... *G06T 17/005* (2013.01); *G05B 19/408* (2013.01); *G05B 19/4097* (2013.01);
(Continued)

(58) Field of Classification Search
CPC ....... G06T 17/00; G06T 17/005; G06T 17/20; G06F 9/40; G06F 30/00; G06F 2119/18;
(Continued)

(56) References Cited

U.S. PATENT DOCUMENTS 6,210,162 B1 * 4/2001 Chishti ................. B33Y 50/00
433/213
8,175,734 B2 5/2012 Fogel et al.
(Continued)

FOREIGN PATENT DOCUMENTS

| EP | 1574996 A2 | 9/2005 |
|---|---|---|
| RU | 2215326 C2 | 10/2003 |
| WO | WO-2012117273 A1 | 9/2012 |

OTHER PUBLICATIONS

Borucinski, M., Design of Non-uniform Truss Structures for Improved Part Properties, 2013, < http://adyancesmst.prz.edu.pl/pdfy/10264-Volume37-Issue4-paper_07.pdf >.

(Continued)

*Primary Examiner* — M. N. Von Buhr
(74) *Attorney, Agent, or Firm* — Fabian VanCott

(57) ABSTRACT

A computer program product for generating data for a three-dimensional (3D) printable object includes a computer readable storage medium. The computer readable storage medium includes computer usable program code embodied therewith. The computer usable program code, when executed by a processing device converts mesh data into a volumetric voxel data set. The voxel data set is organized as an N-ary tree defining at least a portion of the 3D printable object. The computer usable program code converts the N-ary tree of the voxel data set into print instructions defining a truss structure, and prints the 3D object including the truss structure.

20 Claims, 7 Drawing Sheets

(51) Int. Cl.
  *G06F 30/00*  (2020.01)
  *G05B 19/408*  (2006.01)
  *G05B 19/4097*  (2006.01)
  *G06F 119/18*  (2020.01)
(52) U.S. Cl.
  CPC .............. *G06F 30/00* (2020.01); *G06T 17/20* (2013.01); *G05B 2219/49007* (2013.01); *G06F 2119/18* (2020.01)
(58) Field of Classification Search
  CPC .. B33Y 50/00; G05B 19/408; G05B 19/4097; G05B 2219/49007
  See application file for complete search history.

(56) References Cited

U.S. PATENT DOCUMENTS

| | | | |
|---|---|---|---|
| 9,245,383 | B2 | 1/2016 | Co |
| 2003/0197698 | A1 | 10/2003 | Perry et al. |
| 2005/0107992 | A1* | 5/2005 | Kase ................ G06T 17/10 703/2 |
| 2010/0082703 | A1 | 4/2010 | Zhou et al. |
| 2010/0283787 | A1* | 11/2010 | Hamedi ............ G06T 17/005 345/473 |
| 2011/0087350 | A1 | 4/2011 | Fogel et al. |
| 2012/0209526 | A1* | 8/2012 | Imhof .................. G01V 1/306 702/5 |
| 2015/0148930 | A1* | 5/2015 | Kumar ............. G05B 19/4099 700/98 |
| 2016/0019319 | A1* | 1/2016 | Shtilerman .......... B29C 64/386 264/308 |
| 2016/0257077 | A1* | 9/2016 | Brown .................. G06T 17/10 |
| 2017/0225402 | A1* | 8/2017 | Batchelder ........... B33Y 50/02 |
| 2017/0278301 | A1* | 9/2017 | Peterson .............. G06F 19/321 |
| 2018/0240263 | A1* | 8/2018 | Courter ................ G06T 15/005 |

OTHER PUBLICATIONS

Johnston, S.R. et al, Analysis of Mesostructure Unit Cells Comprised of Octet-truss Structures, Sep. 26, 2006 < http://sffsymposium.engr.utexas.edu/Manuscripts/2006/2006-38-Johnston.pdf >.

* cited by examiner

GENERATING DATA FOR A THREE-DIMENSIONAL (3D) PRINTABLE OBJECT, INCLUDING A TRUSS STRUCTURE

BACKGROUND

Three-dimensional (3D) printing is a fabrication process used to produce a 3D object in which successive layers of material are formed under control of a computing device to form the 3D object. Objects can be of almost any shape or geometry and are produced from digital 3D model data. In one example, a 3D scan of an object may be obtained, and the 3D object may be produced based on data obtained from the 3D scan. 3D printing devices form solid objects by printing the successive layers of material wherever instructed by the 3D model data.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
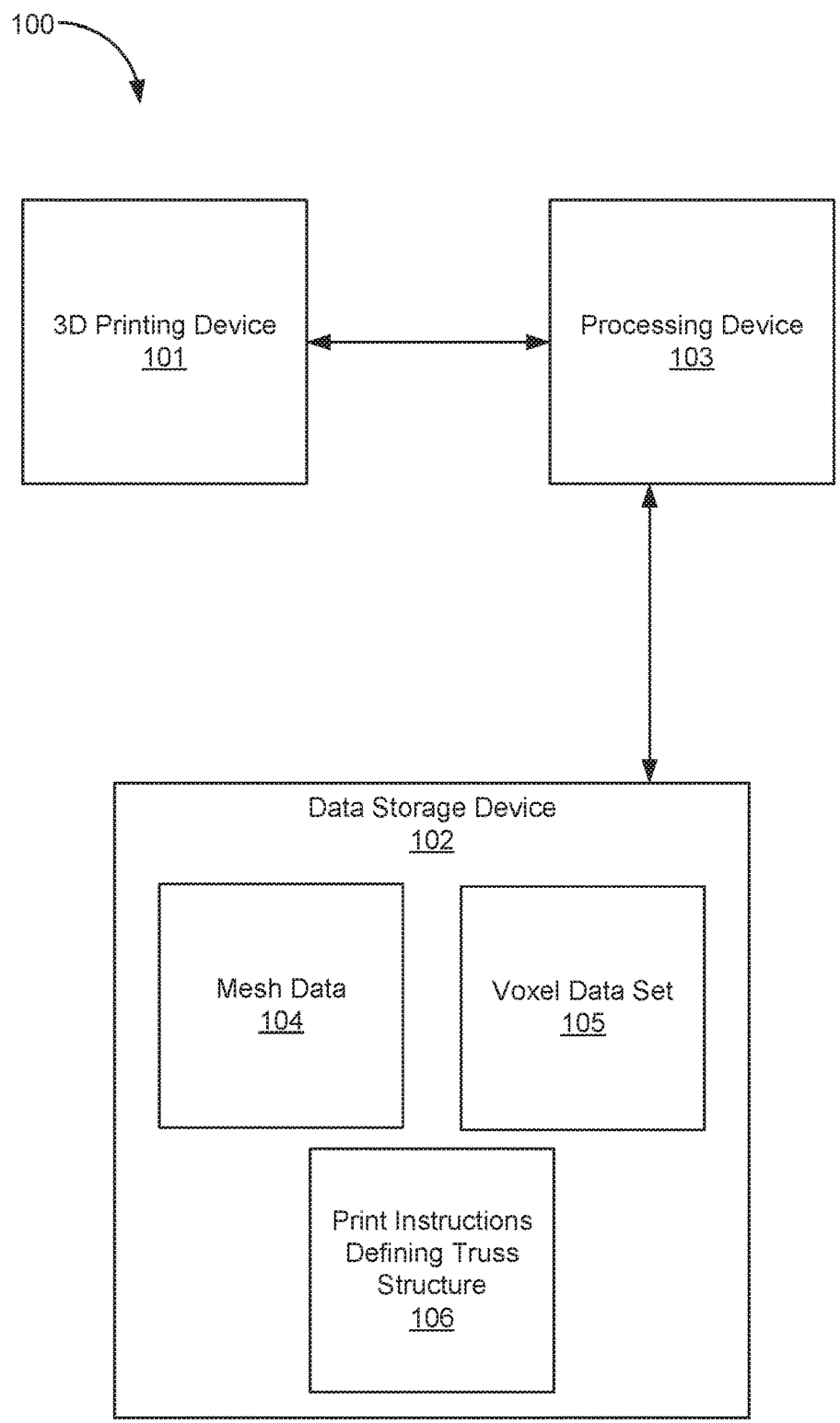
FIG. 1 is a system for generating data for a three-dimensional (3D) printable object, according to one example of the principles described herein.

As mentioned above, a 3D scan of an object may be obtained, and the 3D object may be produced by a 3D printing device based on data obtained from the 3D scan. Even for objects that have thin walls or voids, 3D printing devices form the 3D objects using the successive layers of material in solid portions. These solid portions increase the weight of the printed 3D object. Further, printing of solid objects uses large amounts of printing material that may increase the cost of the printed 3D object.

Examples described herein provide a computer program product for generating data for a three-dimensional (3D) printable object and associated systems and methods includes a computer readable storage medium. The computer readable storage medium includes computer usable program code embodied therewith. The computer usable program code, when executed by a processing device converts mesh data into a volumetric voxel data set. The voxel data set is organized as an N-ary tree defining at least a portion of the 3D printable object. The computer usable program code converts the N-ary tree of the voxel data set into print instructions defining a truss structure, and prints the 3D object including the truss structure. The computer program product may further include computer usable program code to, when executed by the processing device, assign a scalar value to each voxel, and assign a volumetric property to each voxel. The volumetric property may define a type of energy potential.

The computer program product may further include computer usable program code to, when executed by the processing device, identify within the N-ary tree data differences in the volumetric property between the voxels within the voxel data set. If the two neighboring voxels have a volumetric property greater than a first threshold, the relatively larger of the two neighboring voxels may be divided into N-number of three-dimensional divisions. The volumetric property of the N-number of three-dimensional divisions may be interpolated, and the relatively larger voxel may be marked as a non-leaf node in the N-ary tree. If a first voxel has a maximum difference in volumetric property lower than a second threshold relative to the first voxel's siblings then the first voxel and its siblings may be removed from the N-ary tree, and the parent node of the first voxel and its siblings may be marked as a leaf node. A subsequent volumetric property value may be assigned to the parent node based on an average of the volumetric properties of the first voxel and its siblings.

The computer program product may further include computer usable program code to, when executed by the processing device, for a number of iterations assign a material property to each voxel in the N-ary tree data based on each of the voxels' respective scalar values. Each of the scalar values corresponds to a size of the voxels, respectively. A numerical simulation such as, for example, a finite element analysis, may be performed based on the material property and scalar values of each voxel, and more desired material property may be generated based on a computed energy gradient, for example, a strain energy gradient. The new material property may be mapped to the scalar value, and, based on the scalar value, the size of the voxels may be adjusted through merging or subdividing operations.

The computer program product may further include computer usable program code to, when executed by the processing device, generate a shell structure to enclose the 3D object. The shell structure is defined by removing voxel data from the volumetric voxel data set that has a distance value larger than a defined shell thickness. The shell structure may be printed.

The mesh data defines a scanned image of an object. Conversion of the mesh file into the volumetric voxel set may be performed in parallel for a plurality of groups of N-ary tree data by a graphic processing unit (GPU).

Examples described herein also provide a system for generating data for a three-dimensional (3D) printable object. The system includes a 3D printing device, a data storage device to store computer usable program code, and a processing device to execute the computer usable program code. The computer usable program code, when executed by the processing device, converts mesh data into a volumetric voxel data set. The voxel data set may be organized as a N-ary tree such as, for example, an octree, defining at least a portion of the 3D printable object. The computer usable program code, when executed by the processing device, also converts the octree of the voxel data set into print instructions defining a truss structure, and prints the 3D object including the truss structure.

The 3D printing device may be a powder-based 3D printing device. A 3D scanning device may also be included. The 3D scanning device produces the mesh data, and the mesh data defines a scanned image of an object. Conversion of the mesh file into the volumetric voxel set may be performed in parallel for a plurality of groups of octree data by a graphic processing unit (GPU).

Examples described herein also provide a three-dimensional (3D) printing device including a data storage device to store computer usable program code, and a processing device to execute the computer usable program code. The computer usable program code, when executed by the processing device, converts mesh data obtained from a 3D scanning device into a volumetric voxel data set. The voxel data set may be organized as an N-ary tree such as, for example, an octree, defining at least a portion of the 3D printable object. The computer usable program code, when executed by the processing device, assigns a scalar value to each voxel, and assigns a volumetric property to each voxel. The volumetric property defining a gradient of a type of energy potential.

The computer usable program code, when executed by the processing device also converts the octree of the voxel data set into print instructions defining a truss structure within each voxel, adjusts a scalar value of a number of the voxels based on the volumetric properties assigned to the voxels, performs a number of numerical simulations such as, for example, a finite element analysis, based on a material property assigned to each voxel and scalar values of each voxel, and prints the 3D object including the truss structure.

The 3D printing device further includes computer usable program code to, when executed by the processing device, generates a shell structure to enclose the 3D object. The shell structure is defined by removing voxel data from the volumetric voxel data set that has a distance value larger than a defined shell thickness. The 3D printing device further includes computer usable program code to, when executed by the processing device prints the shell structure. Converting the octree of the voxel data set into print instructions defining the truss structure within each voxel includes defining portions of the truss structure based on a smallest feature that the 3D printing device can produce.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a system (100) for generating data for a three-dimensional (3D) printable object, according to one example of the principles described herein. The system (100) includes a 3D printing device (101), a processing device (103), and a data storage device (102). The 3D printing device (101) may be any device capable of forming an object through material deposition in three dimensions. Examples of processes that the 3D printing device (101) may use to form the object may include extrusion deposition processes, processes utilizing the binding of granular materials, lamination processes, photopolymerization processes, powder fed directed energy deposition processes, metal wire processes, continuous liquid interface production processes, other processes, or combinations thereof.

The system (100) may be implemented in an electronic device. Examples of electronic devices include the 3D printing device (101). In this example, the processing device (103) and data storage device (102) are included as integral elements within the 3D printing device (101). In another example, the various elements of the system (100) may be implemented in a plurality of electronic devices including, for example, servers, desktop computers, laptop computers, personal digital assistants (PDAs), mobile devices, smartphones, gaming systems, and tablets, among other electronic devices.

The system (100) may be utilized in any data processing scenario including, stand-alone hardware, mobile applications, through a computing network, or combinations thereof. Further, the system (100) may be used in a computing network, a public cloud network, a private cloud network, a hybrid cloud network, other forms of networks, or combinations thereof. In one example, the methods provided by the system (100) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the system (100) are executed by a local administrator.

The data storage device (102) may include a number of data including, for example, mesh data (104), a voxel data set (105), and print instructions that define truss structures within the voxel data set, Mesh data includes any polygon mesh model. A polygon mesh model is a polygonal representation of a shape where a curved surface is modeled as many small faceted surfaces that are defined by vertices and edges which are lines that connect neighboring vertices.

Figure 2:
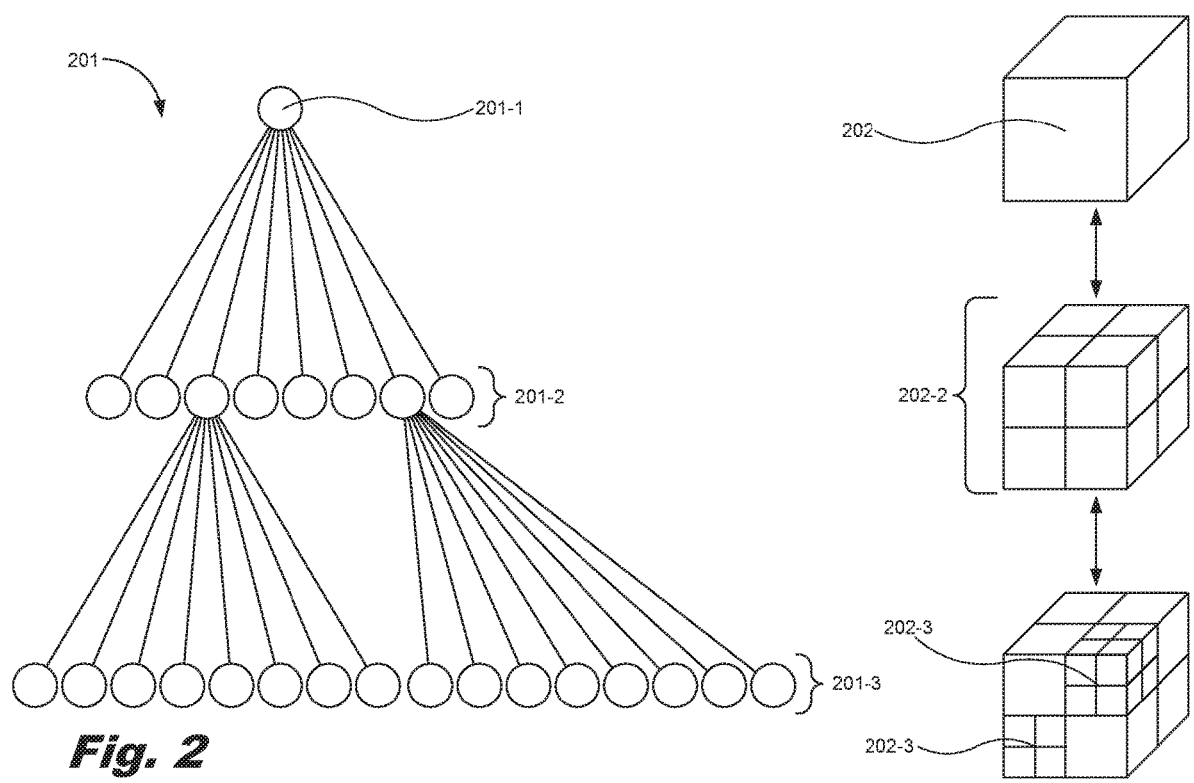
FIG. 2 is a diagram of an octree and corresponding volume voxel depictions, according to another example of the principles described herein.

A voxel data set (105) is derived from the mesh data (104), and includes a number of volumetric voxels that represent a number of values on a regular grid in three-dimensional space. A voxel's position within the 3D space may be inferred based on its relative position to other voxels and its position in the data structure that makes up a single volumetric image. Voxels may be used to represent regularly sampled spaces that have at least one non-homogeneous property throughout. In one example, the mesh data (104) may be converted into the volumetric voxel data set (105) where the voxel data set (105) is organized as an N-ary tree defining at least a portion of the 3D printable object. FIG. 2 is a diagram of an octree (201), as an example of an N-ary tree, and corresponding volume voxel (202, 203, 204) depictions, according to one example of the principles described herein. The N-ary tree (201) may be any tree data structure where each non-leaf node has at least one child. In one example, the N-ary tree may be an octree (201) as depicted in FIG. 2. An octree is a tree data structure in which each internal node has exactly eight children.

In the example of FIG. 2, the octree (201) may include a parent node (201-1), a number of children nodes (201-2), and a number of leaf nodes (201-3). Although a single set of children nodes (201-2) are depicted in the octree (201) of FIG. 2, any number of levels of children nodes (201-2) may be included between the parent node (201-1) and the leaf nodes (201-3). The various levels of the octree (201) of FIG. 2 corresponds to a level of voxel division. Octrees may be used to partition a three-dimensional space such as that represented by the mesh data (104) by recursively subdividing it into eight octants. Further, octrees may be used to combine or merge a three-dimensional space such as that represented by the mesh data (104) by combining eight octants into a single larger octant. Thus, FIG. 2 includes a voxel (202) that corresponds to the parent node (201-1). The voxel (202) may be subdivided or partitioned into eight octants (202-2) that represent the children nodes (201-2), and any of those eight octants (202-2) may be further subdivided into eight octants (202-3) that represent the leaf nodes (201-3). Further, in some examples, and as indicated by the arrows between the depictions of the voxels, voxels may be either merged or subdivided into larger or smaller voxels, respectively. Still further, in order to fill a volume, a number of voxels may be disregarded in order to obtain a desired resolution.

The N-ary tree of the voxel data set (105) may be converted into print instructions (106) where the print instructions define a truss structure for a number of the voxels. As will be described in more detail below, the system (100) is capable of generating a truss lattice structure as volumetric infill for the 3D printable object based on the underlying voxel data set (105) and its N-ary tree data structure. Further, operations associated with the creation of the N-ary tree data structure and the creation of the truss lattice structure volumetric infill may be parallelized on a processing device such that the computations performed by the processing device may be obtained faster.

Figure 3:
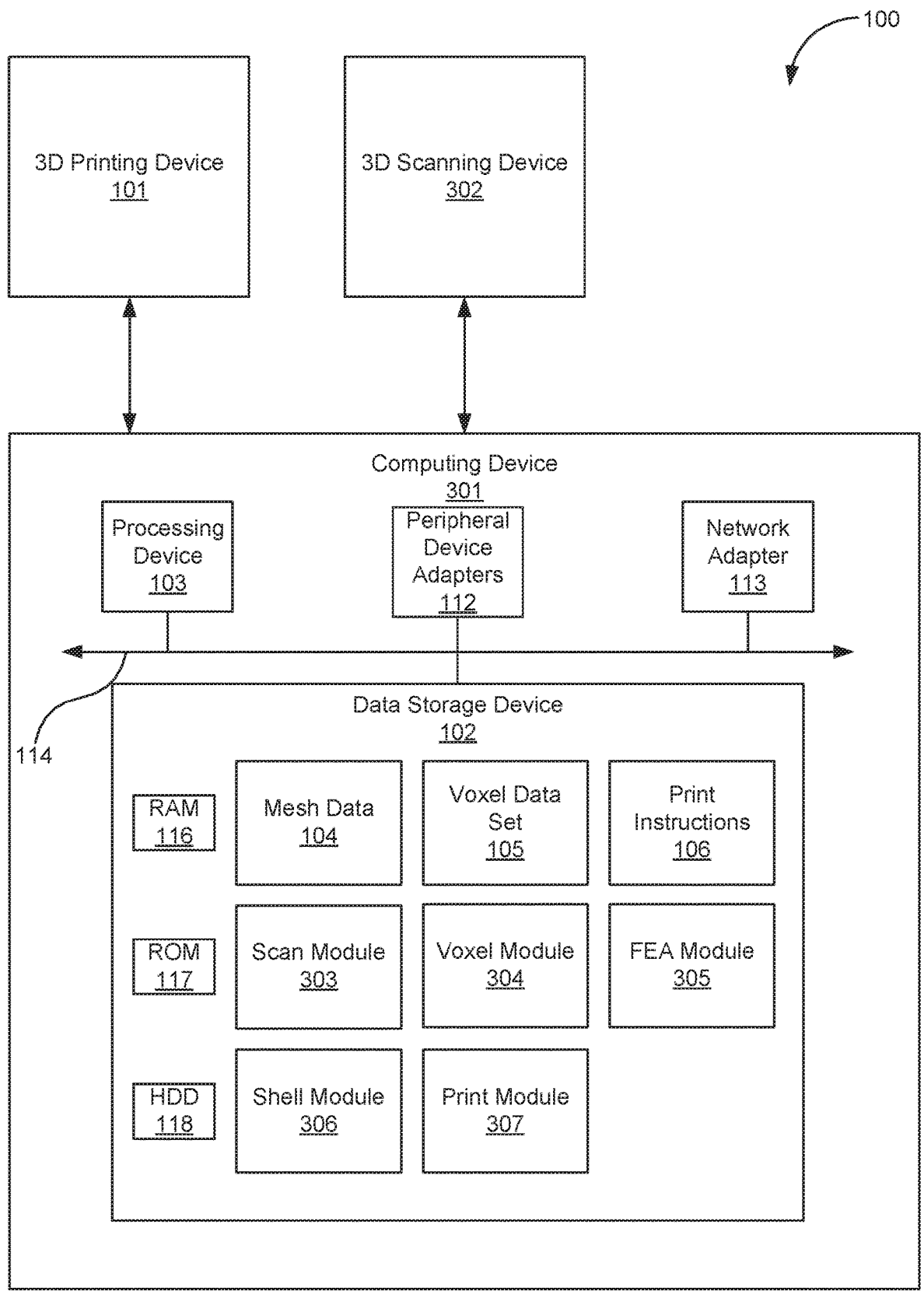
FIG. 3 is a system for generating data for a three-dimensional (3D) printable object, according to another example of the principles described herein.

FIG. 3 is a system (300) for generating data for a three-dimensional (3D) printable object, according to another example of the principles described herein. The system (300) may include the 3D printing device (101) as described in connection with FIG. 3, a 3D scanning device (302), and a computing device (302). The 3D scanning device (302) may be any device that analyzes a physical object to collect data on its shape and appearance. The collected data can then be used to construct digital three-dimensional models such as the mesh data (104).

The computing device (301) may include the processing device (103) described above on connection with FIG. 1. The processing device may be any electronic circuit which performs operations on some external data source including memory or a data stream. To achieve its desired functionality, the system (100) comprises various hardware components. Among these hardware components may be the processing device (103), the data storage device (103), a number of peripheral device adapters (112), and a number of network adapters (113). These hardware components may be interconnected through the use of a number of busses and/or network connections. In one example, the processing device (103), data storage device (102), peripheral device adapters (112), and a network adapter (113) may be communicatively coupled via a bus (114).

The processing device (103) may include the hardware architecture to retrieve executable code from the data storage device (102) and execute the executable code. The executable code may, when executed by the processing device (103), cause the processing device (103) to implement at least the functionality of converting mesh data obtained from the 3D scanning device (302) into a volumetric voxel data set where the voxel data set is organized as an octree defining at least a portion of the 3D printable object. The executable code may also, when executed by the processing device (103), cause the processing device (103) to assign a scalar value (SV) to each voxel, and assign a volumetric property to each voxel where the volumetric property defines a gradient of a type of energy potential. The executable code may also, when executed by the processing device (103), cause the processing device (103) convert the octree of the voxel data set into print instructions defining a truss structure within each voxel, adjust a scalar value of a number of the voxels based on the volumetric properties assigned to the voxels, perform a finite element analysis based on a material property assigned to each voxel and scalar values of each voxel, and print the 3D object including the truss structure. All of these and other functions are performed according to the methods of the present specification described herein. In the course of executing code, the processing device (103) may receive input from and provide output to a number of the remaining hardware units.

The data storage device (102) may store data such as executable program code that is executed by the processing device (103) or other processing device. As will be discussed, the data storage device (102) may specifically store computer code representing a number of applications that the processing device (103) executes to implement at least the functionality described herein.

The data storage device (102) may include various types of memory modules, including volatile and nonvolatile memory. For example, the data storage device (102) of the present example includes Random Access Memory (RAM) (116), Read Only Memory (ROM) (117), and Hard Disk Drive (HDD) memory (118). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processing device (103) may boot from Read Only Memory (ROM) (117), maintain nonvolatile storage in the Hard Disk Drive (HDD) memory (118), and execute program code stored in Random Access Memory (RAM) (116).

Generally, the data storage device (102) may comprise a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (112, 113) in the system (100) enable the processing device (103) to interface with various other hardware elements, external and internal to the system (100). For example, the peripheral device adapters (103) may provide an interface to input/output devices, such as, for example, display device (109), a mouse, or a keyboard. The peripheral device adapters (112) may also provide access to other external devices such as an external storage device, a number of network devices such as, for example, servers, switches, and routers, client devices, other types of computing devices, and combinations thereof. The peripheral device adapters (112) may also create an interface between the processing device (103) and a display device, the 3D printing device (101), the 3D scanning device (302), a display device or other media output devices. The network adapter (113) may provide an interface to other computing devices within, for example, a network, thereby enabling the transmission of data between the system (100) and other devices located within the network.

The system (100) further includes a number of modules used in the implementation of the functionality of the processing device (103) as described herein. The various modules within the system (100) comprise executable program code that may be executed separately. In this example, the various modules may be stored as separate computer program products. In another example, the various modules within the system (100) may be combined within a number of computer program products; each computer program product comprising a number of the modules.

The system (100) may include a scan module (303) to, when executed by the processing device (103), instruct the 3D scanning device (302) to scan an object. The data representing the scanned object may be transmitted to the computing device (301) and stored in the data storage device (102) as mesh data (104) for use in conversion by the processing device (103) to a voxel data set (105).

Figure 4A:
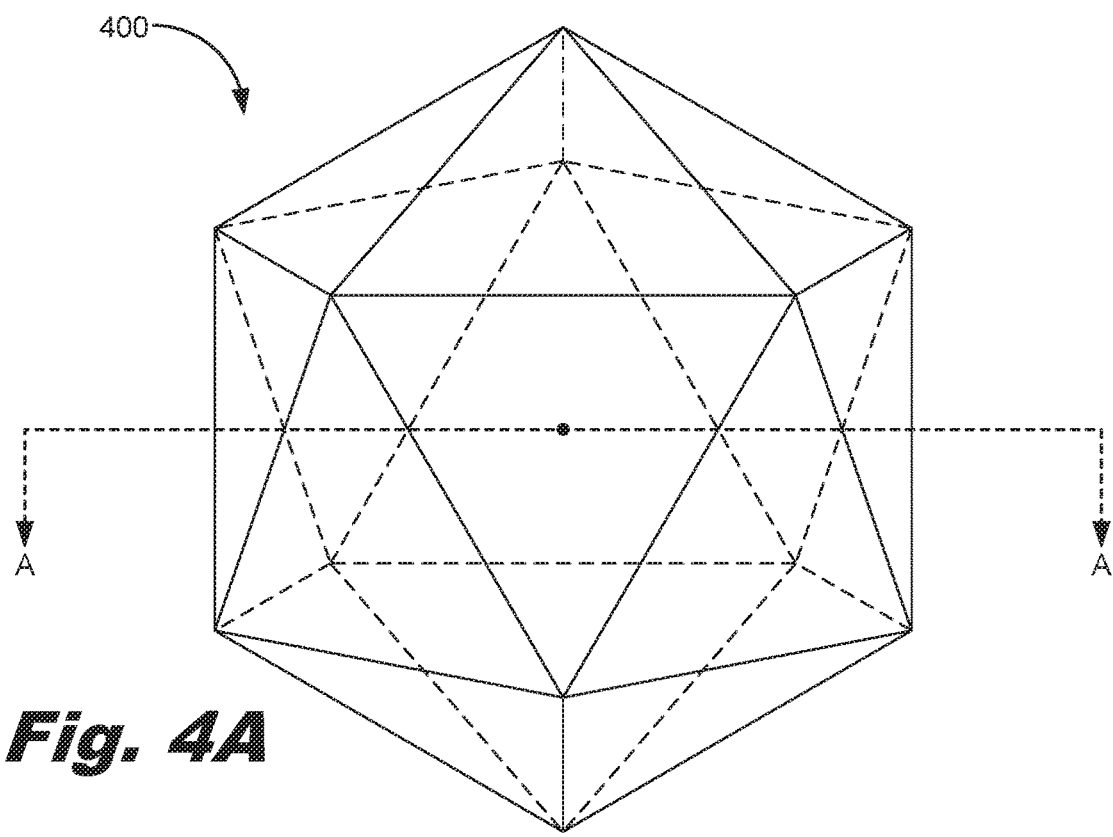
FIG. 4A is a perspective view of scanned mesh data of an object, according to another example of the principles described herein.
Figure 4B:
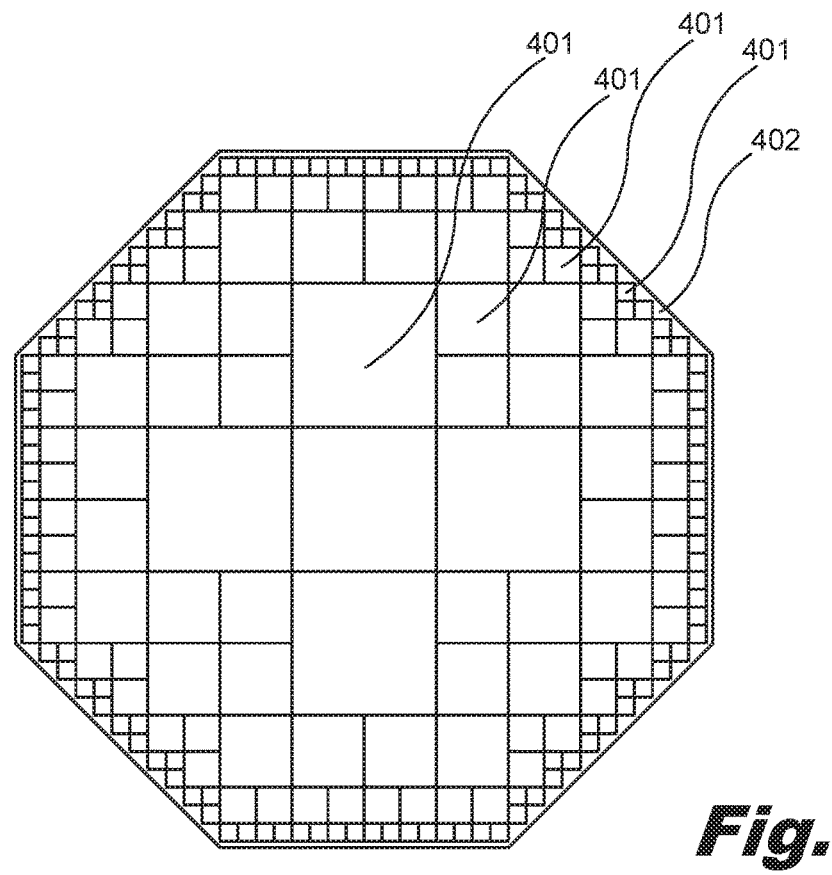
FIG. 4B is a depiction of the scanned mesh data of the object of FIG. 4A along plane A, according to another example of the principles described herein.

The system (100) may also include a voxel module (303) to, when executed by the processing device (103), convert the mesh data (104) into the voxel data set (105). The voxel module (303) also assigns a scalar value to each voxel that uniquely replicates a voxel to a voxel having a different scalar value. A scalar value of a voxel defines a size of the voxel within the voxel data set (105). Thus, a parent node (201-1) is assigned a scalar value that is a relatively larger value than any children nodes (201-2) within the N-ary tree (201). Similarly, the children nodes (201-2) within the N-ary tree (201) are assigned a scalar value that is a relatively larger value than any of the leaf nodes (201-3). In this manner, as the voxels are either merged or subdivided into larger or smaller voxels, respectively, their scalar value assigned to those voxels is decreased or increased, respectively. In the example of the octree (201) of FIG. 2, is optimized to fill the space of the object as defined by the mesh data (104). Relatively smaller voxels with assigned correspondingly smaller scalar voxels are used at and near the boundary of the object to provide for details in the object to be expressed and visualized in the eventual printed object. In contrast, larger voxels with assigned correspondingly larger scalar values are used in the interior of the object to provide for a lighter and stronger portion of the object through the use of the truss structures used in place of otherwise solid voxels. FIG. 4A is a perspective view of scanned mesh data (104) of an object (400), according to another example of the principles described herein. The object (400) is an icosahedron. An icosahedron is a convex polyhedron with 20 faces, 30 edges and 12 vertices. FIG. 4B is a depiction of the scanned mesh data (104) of the object (400) of FIG. 4A along plane A, according to another example of the principles described herein.

As depicted in FIG. 4B, a number of voxels (401) with varying scalar values are depicted. An additional layer or level of children nodes corresponding to intermediary sizes of voxels other than the smallest voxels and the largest voxels are depicted in FIG. 4B. Also, the largest voxels (401) are positioned towards the center of the object (400) and decreasingly smaller voxels (401) are included towards the edges of the object to increase the level of resolution of the object (400).

Further, a shell (402) on the outer portion of the object is also depicted. As will be described in more detail below, a solid shell may be printed using the 3D printing device (101) in order to finish the surface of the object (400). This provides for the ability to form an interior portion of the object (400) that includes voxels of truss structures that are as strong or stronger than a solid-filled voxel, allows for loose material not fixed within the truss structures to fall out of the object (400) during or after printing, and provides for a relatively lighter object (400) due to the loose material not being fixed or included within the object (400) at the end of the printing process, all while allowing for a high-resolution finished object (400) via the shell. In one example, the shell may be adhered to the voxelated portion of the object (400).

The voxel module (303) also, when executed by the processing device (103), converts the N-ary tree of the voxel data set (105) into print instructions defining a number of truss structures that are used as fill for the individual voxels and printed as such instead of a solid block of material. To determine an appropriate truss structure that is to be used as fill for the individual voxels, a volumetric property may be stored for each voxel. An octree (201), for example, may be viewed as spatial distribution of the scalar value. As mentioned above, octree operations include dividing a voxel into a set of smaller voxels where each voxel has a small scalar value, and combining or merging multiple voxels into a single larger voxel where the larger voxel has a larger scalar value. This modifies the design space scalar value.

A volumetric property such as, for example, a gradient of a type of energy potential, may be assigned to each voxel, and may be used to drive the octree (201) operations of partitioning and merging of voxels. In this process, the octree (201) may be scanned. A difference of the property value between any two neighboring voxels exceeding a threshold value is determined and identified, and if the property value between the two neighboring voxels exceeds the threshold value, the larger voxel with the higher scalar value is divided into eight smaller voxels. The property values for the resulting eight voxels are spatially interpolated linearly, for example, and assigned to the respective voxels. The original voxel is then marked as non-leaf parent node (201-1) in the octree (201).

In contrast to division of a voxel, it may be determined if a maximum difference of the property value among all a given voxel's siblings is lower than a threshold value. If the property value is lower than a threshold value with respect to its siblings, this voxel and all its siblings are removed from octree (201), their parent node (201-1) is marked as leaf node (201-3), and an averaged property value is assigned to this voxel.

In one example, a number of regularization operations may be applied to the voxel operations in order to minimize a jump of the property value such as the energy potential described above. For example, if a voxel is linearly, for example, more than twice the size of all its neighbor voxels, a partition operation may be applied to this voxel. Finite element analysis will be described in more detail below.

Figure 5:
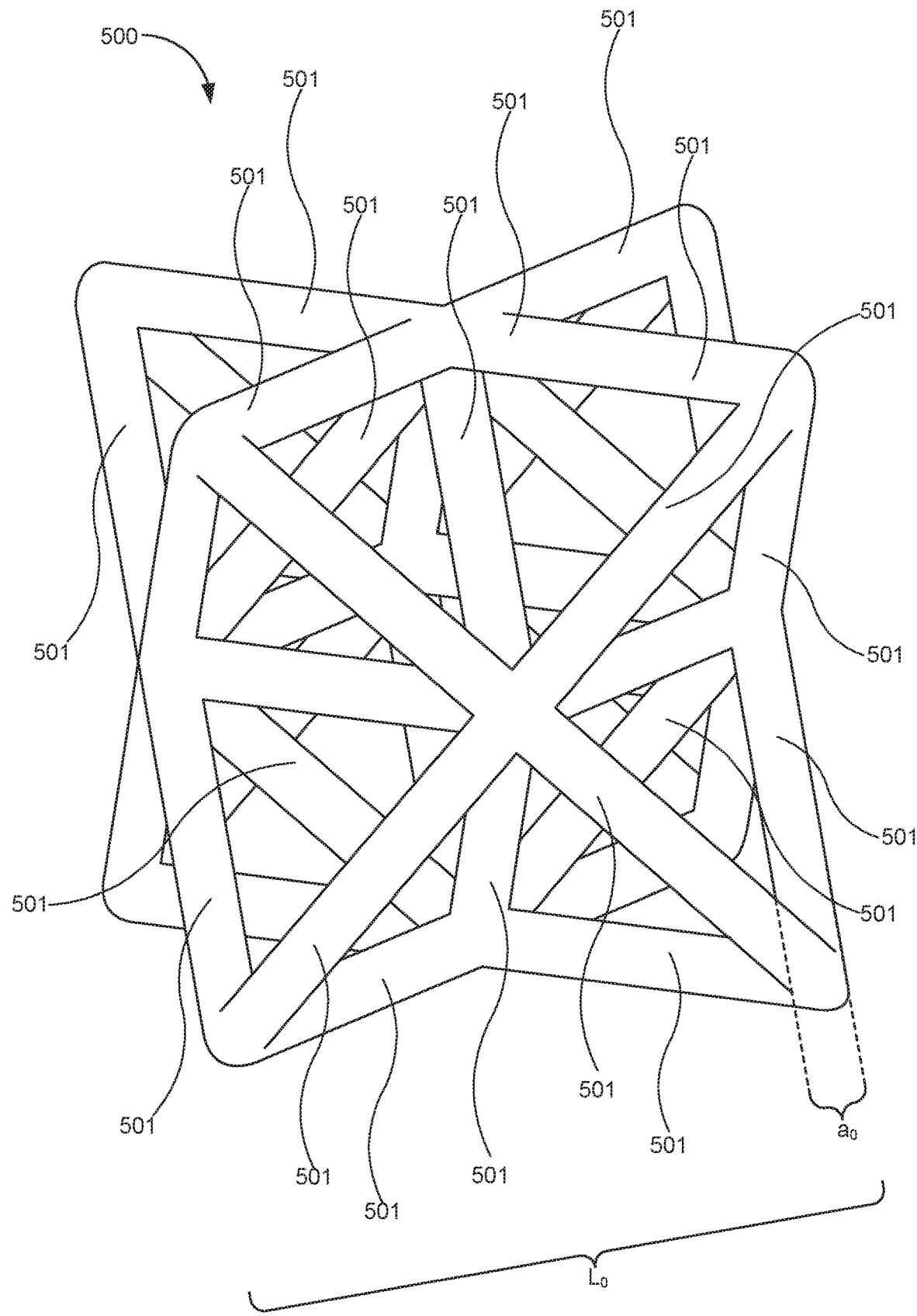
FIG. 5 is a diagram of a truss structure of a voxel, according to another example of the principles described herein.

Regarding the truss structures that are used as fill for the individual voxels, FIG. 5 is a diagram of a truss structure (500) of a voxel (501), according to one example of the principles described herein. Thus, the voxel module (303) also, when executed by the processing device (103), defines a number of truss structures that are used as fill for the individual voxels within the voxel data set (105). The truss structure (500) depicted in FIG. 5 is an example of types, forms, and designs of the truss structures, and any type of truss structure may be used. Further, the process of mapping the voxels to a defined truss structure may be applied to the examples of truss structures described herein or other examples of truss structures.

In the example of FIG. 5, a number of cylindrical struts (501) of a constant radius of $a_0$ may be used within the truss structure (500). In one example, the voxel boundary with its six sides may interface with a neighboring voxel of the same size and scalar value. Several of the cylindrical struts (501) of the truss structure (500) may be formed within the voxel's boundary as half cylinders such that when a neighboring voxel's truss structure interfaces with the truss structure (500) of the voxel of FIG. 5, the neighboring voxel's truss structure complete the half cylinder for that side the neighboring voxel contacts.

FIG. 5 depicts an example of the truss structure (500) as may be formed within each voxel, and defines $a_0$. In one example, $a_0$ may be correlated with the smallest feature that the 3D printing device (101) can accurately and reliably produce. The size of a given voxel and the corresponding size of the octet scales with its scalar value. The smallest voxel size $L_0$ may be defined based on $a_0$. The smallest voxel size allowed may be sufficiently larger than $a_0$ to provide for sufficient openness of the truss structure (500) to allow excess powder removal. Sufficient openness to provide removal of excess powder may include, for example, allowing sand flow for sand blasting processes or air flow for vacuum-based procedures. As will be made apparent below, the truss structures are not used to capture the fine shape or high resolution of the object (400). Determining the smallest voxel size $L_0$ allows for the tuning of the voxel size and $a_0$ for manufacturability purposes.

In the example of the truss structure (500) of FIG. 5, two classes of connective nodes may be defined. The truss structure (500) may include six faces each of which may include four vertices and a center of the face as nodes of the voxel. If this voxel is placed against a voxel of the same size and scalar value, all these five nodes are connected and supported. If, however, this voxel is placed against a voxel of a different size, the other voxel may be either twice the linear size of this voxel or half this voxel size. In either case, a pair of boundary nodes will be supported: namely, the two boundary nodes that cut through this face diagonally. Further, the octree (201) demands that, in a situation where two neighboring voxels are not the same size, two additional voxels may be placed neighboring to both voxels and reinforce the connectivity and structural support of the two neighboring voxels.

A voxel's apparent material properties may also be considered when determining the dimensions of the voxel including $a_0$ and $L_0$. For each voxel that is instantiated with such predefined truss structure of its scalar value, its apparent elastic property may be defined by the following equation:

$$(\varepsilon_1, \varepsilon_2, \varepsilon_3, \varepsilon_{23}, \varepsilon_{13}, \varepsilon_{12})^T = (SV)^2 \frac{1}{E_{bas\_material}} \hat{I}(a_0, L_0)(\sigma_1, \sigma_2, \sigma_3, \sigma_{23}, \sigma_{13}, \sigma_{12},)^T \qquad \text{Eq. 1}$$

where $\hat{I}(a_0, L_0)$ is a tensor constant.

In cases where $a_0$ is very small compared to $L_0$, this tensor constant has an analytical form. However, the voxel-based apparent material property may be extracted experimentally, or using numerical simulations, such as finite element analysis (FEA), or combinations thereof. Established computational procedures may be applied to different truss structures, to different physical properties, to elasticity, or combinations thereof.

Having described the truss structure (500) of FIGS. 5 and 6, and turning again to FIG. 3, the system (100) may further include a finite element analysis (FEA) module (303) to, when executed by the processing device (103), assign each voxel within the voxel data set (105) an apparent material property as described above based on its scalar value, and execute a finite element analysis. Finite element analysis (FEA) is a numerical technique for finding approximate solutions for partial differential equations, and divides a large problem into smaller, simpler parts. The simple equations that model these finite elements are then assembled into a larger system of equations that models the entire problem. The subdivision of a whole domain into simpler parts has several advantages including, of example, accurate representation of complex geometry, inclusion of dissimilar material properties, easy representation of the total solution, and capture of local effects. The method may include dividing the domain of the problem into a collection of subdomains, with each subdomain represented by a set of element equations to the original problem, followed by systematically recombining all sets of element equations into a global system of equations for the final calculation. The global system of equations has known solution techniques, and can be calculated from the initial values of the original problem to obtain a numerical answer.

A result of the FEA in the context of the present system (100) is strain energy on the truss structures of the voxels within the voxel data set (105), and that strain energy's field gradient. The FEA module (305) may compute the resulting strain energy gradient for each voxel defined within the voxel data set (105), and determines if a higher stiffness for the voxels is desired. For a given voxel whose apparent material property is to be adjusted, this voxel is marked, and the FEA module (305) adjusts, for example, the stiffness of the materials, which translates to the desired adjustment for the scalar value of that voxel.

After completing the marking exercise for each voxel in the voxel data set (105), an octree walk may be performed where the octree operations of partitioning and merging are executed based on indicated change in scalar value for each voxel. The resulting octree (201) may be mapped with a new apparent material property field defining a new material property for each voxel, and a new FEA process may be executed.

In this manner, the voxel data set (105) may be subjected to a number of iterative apparent material property assignments and FEA processes until the resulting octree data is optimized. Additional regularization procedures may be used to preserve the convergence of such optimization procedure. For example, for each iteration, the number of voxels that may be adjusted may be restricted to a certain threshold number. In another example, for any given voxel, the frequency of the octree operation may be capped at a predefined number of iterations such that, for example, an adjustment operation may occur at most every three iterations.

The result of the execution of modules (303, 304, 305) by the data storage device (102) is an octree (201) that represents the interior portion of the object (400). The octree (201) can achieve desired part functional behavior, and may be manufactured, the manufacturing process including using a powder removal process to remove excess powder within the voids formed by the truss structures (500). In one example, an outer layer of voxels may be caused to be printed without the truss structures. In this example of a closed-lattice object (400) the lose powders that may fall out of the interior open-lattice truss structures may be left trapped inside the object (400). In another example, the loose powders of the interior open-lattice truss structures may be removed as the printing process is executed in order to reduce the weight of the object (400).

However, as mentioned above, the object (400) may be voxelated, and may not include the level of voxel resolution that results in a sharp boundary or an adequate surface texture. Thus, in one example, a shell structure may be generated. Thus, with reference to FIG. 3 again, a shell module (304) included in the data storage device (102) may, when executed by the processing device (103), define a shell structure for application to the voxelated object (400). In one example, shell (402) generation may be performed independent of the generation of the interior, voxel truss structures.

In another example, the shell (402) may be performed along with the generation of the interior, voxel truss structures. In this example, loose powder from the printing of the interior, voxel (401) truss structures may be removed as the object (400) is printed, and the shell (402) generation may include printing solid portions on the exterior of the leaf node (201-3) voxels to the extent of the object defined by the mesh data (104).

The shell module (304) may, when executed by the processing device (103), determine a distance field for each voxel within the octree (201). The shell structure (402) may be generated for the object removing all voxels of which the distance value is larger than a given shell thickness. In this manner, the thickness of the shell (402) may be defined. In one example, the shell thickness may be a tunable parameter that addresses possible wear and tear associated with potential handling of the object (402), Further, the thickness may be tuned to address functional and structural impacts when the shell is added to the interior, voxel truss structures. A thicker shell (402) may be used to assist in raising the stiffness of a portion of the object (400).

In one example, the shell may be formed in a number of separate pieces. This allows for the separate pieces to be fitted to the interior, voxel (401) truss structures individually. In this example, a part skeleton may be computed by identifying voxels within the voxel data set (105) that have maximum values of the distance field. A number of partition planes may be generated following the part skeleton which will partition the shell (402) into multiple pieces. In one example, each partitioned piece of the shell (402) may not have any enclosures in which loose powders may be enclosed. Further, the shell pieces may be printed by the 3D printing device (101) using a maximum droplet density to ensure the sharpest surface quality in the shell.

Figure 6:
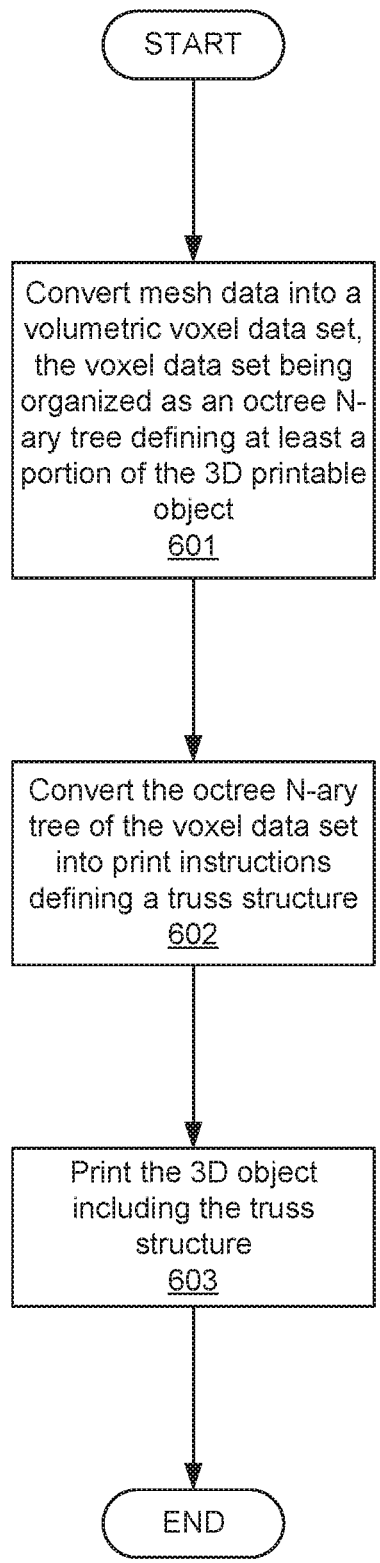
FIG. 6 is a flowchart depicting a method of generating data for a three-dimensional (3D) printable object, according to one example of the principles described herein.

With reference to FIG. 3, the print module (303), when executed by the processing device (103), instructs the 3D printing device (101) to print the interior, voxel (401) truss structures and the shell (402). Once the pieces of shell and the voxel (401) truss structures are printed, the pieces of the shell (402) may be coupled to the interior, voxel (401) truss structures using, for example, an adhesive. In one example, a number of markers may be generated and fabricated into the number of partitions of the shell (402) to assist in the assembly of the shell (402) to the interior, voxel truss structures, FIG. 6 is a flowchart depicting a method of generating data for a three-dimensional (3D) printable object, according to one example of the principles described herein. The method of FIG. 6 may include, with the processing device (103) executing the voxel module (304), converting (block 601) mesh data (104) into a volumetric voxel data set (105). The voxel data set may be organized as an N-ary tree (201) defining at least a portion of the 3D printable object. The N-ary tree (201) of the voxel data set (105) may be converted (block 602) into print instructions (106) defining a truss structure. The 3D printing device (101) may then be instructed by the processing device (103) executing of the print module (307) to use the print instructions (106) to print (block 603) the object (400) including the truss structures.

Figure 7:
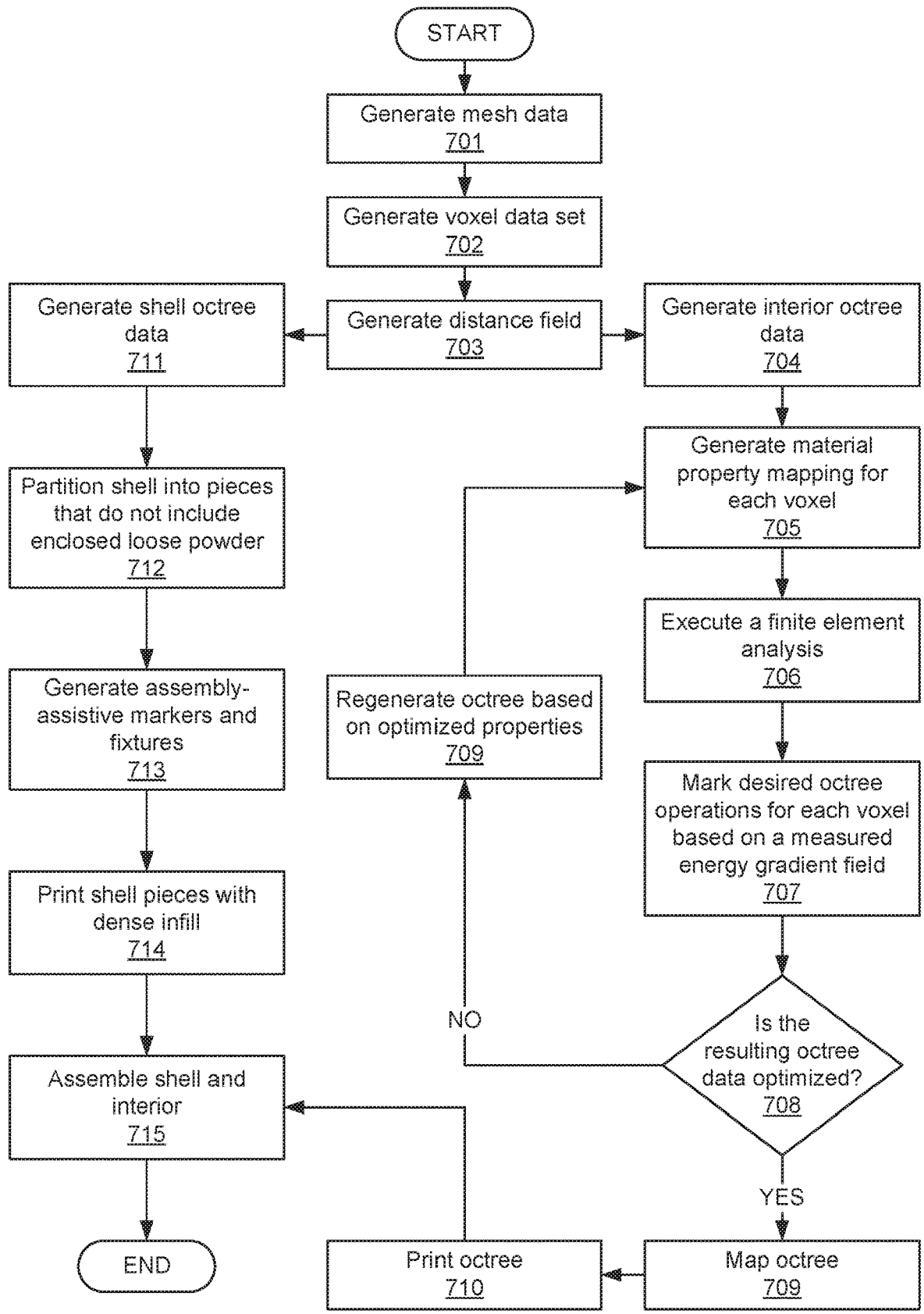
FIG. 7 is a flowchart depicting a method of generating data for a three-dimensional (3D) printable object, according to another example of the principles described herein.

FIG. 7 is a flowchart depicting a method of generating data for a three-dimensional (3D) printable object, according to another example of the principles described herein. The method of FIG. 7 may include generating (block 701) mesh data (104) based on an input scan of an object (400) obtained from the 3D scanning device (302). A voxel data set (205) may be generated (block 702). The method may also include generating (block 703) a distance field for each voxel within the voxel data set (205).

Interior octree data (201) is generated (block 704) in order to generate (block 705) material property mapping for each voxel (401), The material property mapping includes the volumetric properties such as, for example, the gradient of a type of energy potential that is assigned to each voxel (401). The FEA may be executed (block 706), and a number of desired octree operations may be marked (block 707) for each voxel based on a measured energy gradient field.

The method may then determine (block 708) if the resulting octree data is optimized. If the resulting octree data is not optimized (block 708, determination NO), then the octree (201) may be regenerated based on a number of optimized properties (block 709), and the method may loop back to block 705 where the material property mapping for each voxel (401) is generated (block 705).

The loop including blocks 705 through 709 may be performed any number of iterations until optimized octree data is obtained (block 708, determination YES). The octree (201) may then be mapped (block 709) and printed (block 710) by the 3D printing device (101).

Returning to block 703, the method may further include generating (block 711) shell octree data for use in producing the shell (402) of the object (400). The shell (402) may be partitioned (block 712) into a number of pieces that do not include enclosed loose powder. A number of assembly-assistive markers and fixtures may be generated (block 713)

to assist in the assembly of the pieces of the shell (402) to the interior, voxel (401) truss structures. The shell pieces (402) may then be printed (block 714) using the 3D printing device. The shell pieces (402) are printed using dense infill as opposed to a truss structure included in the interior, voxel (401) truss structures.

Once the interior, voxel (401) truss structures and the shell pieces (402) are printed, they may be assembled (block 715) together. The result is a stronger, lighter weight, high resolution object (400) that cost less to manufacture due to the use of less printing materials such as powders used in the 3D printing process.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processing device (103) of the computing device (301) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a computer program product for generating data for a three-dimensional (3D) printable object and associated systems and methods includes a computer readable storage medium. The computer readable storage medium includes computer usable program code embodied therewith. The computer usable program code, when executed by a processing device converts mesh data into a volumetric voxel data set. The voxel data set is organized as an N-ary tree defining at least a portion of the 3D printable object. The computer usable program code converts the N-ary tree of the voxel data set into print instructions defining a truss structure, and prints the 3D object including the truss structure.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computer program product for generating data for a three-dimensional (3D) printable object, the computer program product comprising:
   a non-transitory computer readable storage medium comprising computer usable program code embodied therewith, the computer usable program code to, when executed by a processing device:
      convert mesh data into a volumetric voxel data set, the voxel data set being organized as an N-ary tree defining at least a portion of the 3D printable object;
      convert the N-ary tree of the voxel data set into print instructions defining a truss structure as volumetric infill within voxels of the 3D printable object; and
      print the 3D object including the truss structure.

2. The computer program product of claim 1, further comprising computer usable program code to, when executed by the processing device, assign a scalar value to each voxel.

3. The computer program product of claim 2, further comprising computer usable program code to, when executed by the processing device, assign a volumetric property to each voxel, the volumetric property defining a type of energy potential.

4. The computer program product of claim 3, further comprising computer usable program code to, when executed by the processing device:
   identify within the N-ary tree data differences in the volumetric property between the voxels within the voxel data set;
   if the two neighboring voxels have a volumetric property greater than a first threshold:
      divide the relatively larger of the two neighboring voxels into N-number of three-dimensional divisions;
      interpolate the volumetric property of the N-number of three-dimensional divisions; and
      mark the relatively larger voxel as a non-leaf node in the N-ary tree;
   if a first voxel has a maximum difference in volumetric property lower than a second threshold relative to the first voxel's siblings:
      remove the first voxel and its siblings from the N-ary tree;
      mark the parent node of the first voxel and its siblings as a leaf node; and
      assign a subsequent volumetric property value to the parent node based on an average of the volumetric properties of the first voxel and its siblings.

5. The computer program product of claim 4, further comprising computer usable program code to, when executed by the processing device, for a number of iterations:
   assign a material property to each voxel in the N-ary tree data based on each of the voxels' respective scalar values, each of the scalar values corresponding to a size of the voxels, respectively;
   perform a finite element analysis based on the material property and scalar values of each voxel; and
   generate a new material property based on a computed strain energy gradient; and
   map the new material property to the scalar value; and
   based on the scalar value, adjust the size of the voxels through merging or subdividing operations.

6. The computer program product of claim 1, further comprising computer usable program code to, when executed by the processing device:
   generate a shell structure to enclose the 3D object, the shell structure being defined by removing voxel data from the volumetric voxel data set that has a distance value larger than a defined shell thickness; and
   print the shell structure.

7. The computer program product of claim 1, wherein the mesh data defines a scanned image of an object.

8. The computer program product of claim 1, wherein conversion of the mesh file into the volumetric voxel set is performed in parallel for a plurality of groups of N-ary tree data by a graphic processing unit (GPU).

9. A system for generating data for a three-dimensional (3D) printable object comprising:
   a 3D printing device;
   a data storage device to store computer usable program code; and a processing device to execute the computer usable program code, the computer usable program code to, when executed by the processing device:
convert mesh data representing the 3D printable object into a volumetric voxel data set, the voxel data set being organized as an octree defining the 3D printable object to be formed;
convert the octree of the voxel data set into print instructions defining a truss structure within the 3D printable object to be formed; and
print the 3D object including the truss structure.

10. The system of claim 9, wherein the 3D printing device comprises a powder-based 3D printing device.

11. The system of claim 9, further comprising a 3D scanning device, wherein the 3D scanning device produces the mesh data, the mesh data defining a scanned image of an object.

12. The system of claim 9, wherein conversion of the mesh file into the volumetric voxel set is performed in parallel for a plurality of groups of octree data by a graphic processing unit (GPU).

13. The system of claim 9, wherein the truss structure is volumetric infill within voxels of the 3D printable object.

14. The system of claim 9, wherein voxels of the voxel data set are of different sizes, with larger voxels being internal to the 3D printable object and smaller voxels being at a surface of the 3D printable object.

15. The system of claim 14, wherein the truss structure is volumetric infill within at least some of the larger voxels internal to the 3D printable object.

16. The system of claim 9, wherein the truss structure is composed of a number of cylindrical struts of a constant diameter.

17. The system of claim 9, wherein the truss structure is formed within the boundary of a voxel.

18. A three-dimensional (3D) printing device comprising:
a data storage device to store computer usable program code; and
a processing device to execute the computer usable program code, the computer usable program code to, when executed by the processing device:
convert mesh data obtained from a 3D scanning device into a volumetric voxel data set, the voxel data set being organized as an octree defining at least a portion of the 3D printable object;
assign a scalar value to each voxel;
assign a volumetric property to each voxel, the volumetric property defining a gradient of a type of energy potential;
convert the octree of the voxel data set into print instructions defining a truss structure within each voxel;
adjust a scalar value of a number of the voxels based on the volumetric properties assigned to the voxels;
perform a finite element analysis based on a material property assigned to each voxel and scalar values of each voxel; and
print the 3D object including the truss structure.

19. The 3D printing device of claim 18, further comprising computer usable program code to, when executed by the processing device:
generate a shell structure to enclose the 3D object, the shell structure being defined by removing voxel data from the volumetric voxel data set that has a distance value larger than a defined shell thickness; and
print the shell structure.

20. The 3D printing device of claim 18, wherein converting the octree of the voxel data set into print instructions defining the truss structure within each voxel comprises defining portions of the truss structure based on a smallest feature that the 3D printing device can produce.

* * * * *